(12) United States Patent
Demaison

(10) Patent No.: US 11,639,707 B2
(45) Date of Patent: May 2, 2023

(54) METHOD FOR MONITORING THE SPARK PLUGS OF A TURBOSHAFT ENGINE USING A VIBRATION MEASUREMENT

(71) Applicant: SAFRAN AIRCRAFT ENGINES, Paris (FR)

(72) Inventor: François Maurice Marcel Demaison, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 63 days.

(21) Appl. No.: 17/059,369

(22) PCT Filed: May 28, 2019

(86) PCT No.: PCT/FR2019/051242
§ 371 (c)(1),
(2) Date: Nov. 27, 2020

(87) PCT Pub. No.: WO2019/229364
PCT Pub. Date: Dec. 5, 2019

(65) Prior Publication Data
US 2021/0239085 A1 Aug. 5, 2021

(30) Foreign Application Priority Data

May 29, 2018 (FR) ...................................... 1854573

(51) Int. Cl.
*F02C 6/20* (2006.01)
*F02P 17/12* (2006.01)

(52) U.S. Cl.
CPC .............. *F02P 17/12* (2013.01); *F02C 6/20* (2013.01); *F05D 2220/323* (2013.01); *F05D 2270/334* (2013.01)

(58) Field of Classification Search
CPC .. F02C 7/26; F02C 7/262; F02C 7/264; F02C 7/266; F23R 2900/00013; G06F 30/15;
(Continued)

(56) References Cited

U.S. PATENT DOCUMENTS 8,747,102 B2 * 6/2014 Boguszewski .......... F23N 5/123
431/74
10,415,480 B2 * 9/2019 Han ......................... F23R 3/28
(Continued)

FOREIGN PATENT DOCUMENTS

FR 2 968 143 B1 12/2012
FR 2 998 003 A1 5/2014

OTHER PUBLICATIONS

International Search Report dated Sep. 26, 2019 in PCT/FR2019/051242 filed on May 28, 2019, 2 pages
(Continued)

*Primary Examiner* — Todd E Manahan
*Assistant Examiner* — Thuyhang N Nguyen
(74) *Attorney, Agent, or Firm* — Oblon, McClelland, Maier & Neustadt, L.L.P.

(57) ABSTRACT

A method for monitoring an aircraft turboshaft engine including a vibration sensor capable of outputting a vibration signal and a spark plug. The method includes, based on the vibration signal output by the vibration sensor, a step of determining a level of vibration of the turboshaft engine as well as a step of determining an indicator of spark plug wear.

24 Claims, 3 Drawing Sheets

(58) Field of Classification Search
CPC . G06F 30/17; G06F 2119/02; G05B 23/0221; G05B 23/021
See application file for complete search history.

(56) References Cited

U.S. PATENT DOCUMENTS

| | | | | |
|---|---|---|---|---|
| 10,443,842 | B2* | 10/2019 | Song | F02C 9/28 |
| 10,760,793 | B2* | 9/2020 | Patel | F23R 3/286 |
| 2007/0062196 | A1* | 3/2007 | Gleeson | F23N 5/242 |
| | | | | 60/722 |
| 2015/0036781 | A1* | 2/2015 | Youssef | F02C 7/266 |
| | | | | 377/15 |
| 2015/0285093 | A1* | 10/2015 | Foiret | F02C 7/26 |
| | | | | 73/112.01 |
| 2015/0322863 | A1* | 11/2015 | Burke | F23N 5/08 |
| | | | | 73/112.01 |
| 2017/0089577 | A1* | 3/2017 | DeSilva | F23Q 23/10 |
| 2017/0361947 | A1* | 12/2017 | Kessie | G06Q 10/06 |

OTHER PUBLICATIONS

French Preliminary Search Report dated Feb. 6, 2019 in French Application 1854573 filed on May 29, 2018 (with English translation of Categories of Cited Documents), 2 pages.

* cited by examiner

METHOD FOR MONITORING THE SPARK PLUGS OF A TURBOSHAFT ENGINE USING A VIBRATION MEASUREMENT

TECHNICAL FIELD

The field of the invention is that of monitoring the condition of aircraft turboshaft engine parts. The invention more particularly relates to monitoring the wear of the spark plugs for a combustion chamber of an aircraft turboshaft engine.

PRIOR ART

A spark plug is an electrical device used in spark ignition engines such as aircraft turboshaft engines, which causes a gas mixture to ignite in a combustion chamber. Spark plugs are more particularly used to generate hundreds of sparks per minute, hereinafter referred to as breakdowns.

Each spark is produced between two electrodes. Particles are thus torn away from the electrodes with each breakdown, which leads to gradual wear of the electrodes. Moreover, the spark plugs are located in the flame during engine operation, which can lead to corrosion and carbonisation deposits on the electrodes. Furthermore, fine particles circulating in the gas mixture can also cause erosion of the electrodes. The spark plugs thus lose efficiency over time until they no longer produce enough energy to ignite the gas mixture in the combustion chamber.

Spark plug wear is not the sole cause of non-ignition of the gas mixture. For example, non-ignition can be the result of a failure of the excitation circuit for the spark plugs which outputs breakdown pulses thereto upon receipt of an ignition command. Investigative work must thus be carried out to identify the cause of non-ignition.

In order to prevent a spark plug that has become ineffective from delaying a flight's take-off in order to identify such a cause of non-ignition, spark plugs are usually replaced in a preventive manner on the basis of a fixed operating time.

However, such preventive maintenance is not satisfactory. More specifically, if the fixed operating time adopted is too long, the risk of ignition failure due to excessive spark plug wear cannot be ruled out. On the other hand, if the fixed operating time adopted is too short, there is a risk that the spark plugs are replaced too soon when they are still perfectly capable of ensuring ignition.

In order to bypass this difficulty, the condition of a spark plug can be monitored in order to estimate a degree of wear and to deduce therefrom a remaining service life before replacement is recommended. This condition monitoring can consist of counting the number of breakdowns of the spark plug to estimate a wear indicator and to take into account the operating context of the spark plug (for example an average temperature in the environment of the spark plug) to give a deterioration weighting to this indicator.

In order to detect and count the breakdowns of a spark plug, document FR 2 968 143 B1 proposes using a dedicated sensor that is sensitive to the light signal emitted by the spark plug during the breakdown thereof. Such a dedicated sensor inevitably results in an additional cost and a heavier on-board weight.

DESCRIPTION OF THE INVENTION

The purpose of the invention is to propose a technique for monitoring the condition of a spark plug by means of detecting the breakdowns of the spark plug which does not require the use of a sensor specifically dedicated to carrying out this detection function.

For this purpose, the invention proposes a method for monitoring an aircraft turboshaft engine including a vibration sensor capable of outputting a vibration signal and a spark plug. This method comprises, based on the vibration signal output by the vibration sensor, both determining a level of vibration of the turboshaft engine as well as determining a wear indicator of the spark plug.

Some preferred, however non-limiting aspects of this method are as follows:
  determining the spark plug wear indicator comprises the following steps of:
    filtering the vibration signal output by the vibration sensor;
    detecting breakdown peaks in the filtered vibration signal; and
    characterising the detected breakdown peaks;
  the characterisation of the detected breakdown peaks can comprise one or all of counting the peaks, determining an amplitude of each peak, determining a frequency of the peaks and computing a peak aperiodicity indicator;
  it comprises transmitting an ignition command to an excitation circuit which is configured to output breakdown pulses to the spark plug upon receipt of the ignition command and filtering the vibration signal is only implemented when the ignition command is being transmitted and/or detecting and characterizing the breakdown peaks are only implemented when the ignition command is being transmitted;
  it comprises, on the basis of the characterisation of the peaks detected, discriminating between a fault in the spark plug and a fault in an excitation circuit configured to output breakdown pulses to the spark plug upon receipt of an ignition command;
  it comprises determining a consolidated wear indicator by means of combining, using a spark plug damage model, the characterisation of the breakdown peaks and operating conditions for igniting the turboshaft engine determined, for example, from measurements of at least one operating parameter from among a temperature, a pressure, a hygrometry, an air jet flow velocity and a fuel injection rate;
  the spark plug damage model determines a weighting parameter from the ignition operating conditions and weights the spark plug wear indicator using the weighting parameter to determine the consolidated wear indicator.

BRIEF DESCRIPTION OF THE FIGURES

Other aspects, purposes, advantages and features of the invention will be better understood upon reading the following detailed description given of the non-limiting preferred embodiments of the invention, provided for illustration purposes, with reference to the accompanying drawings, in which.

DETAILED DESCRIPTION OF SPECIFIC EMBODIMENTS

Figure 1:
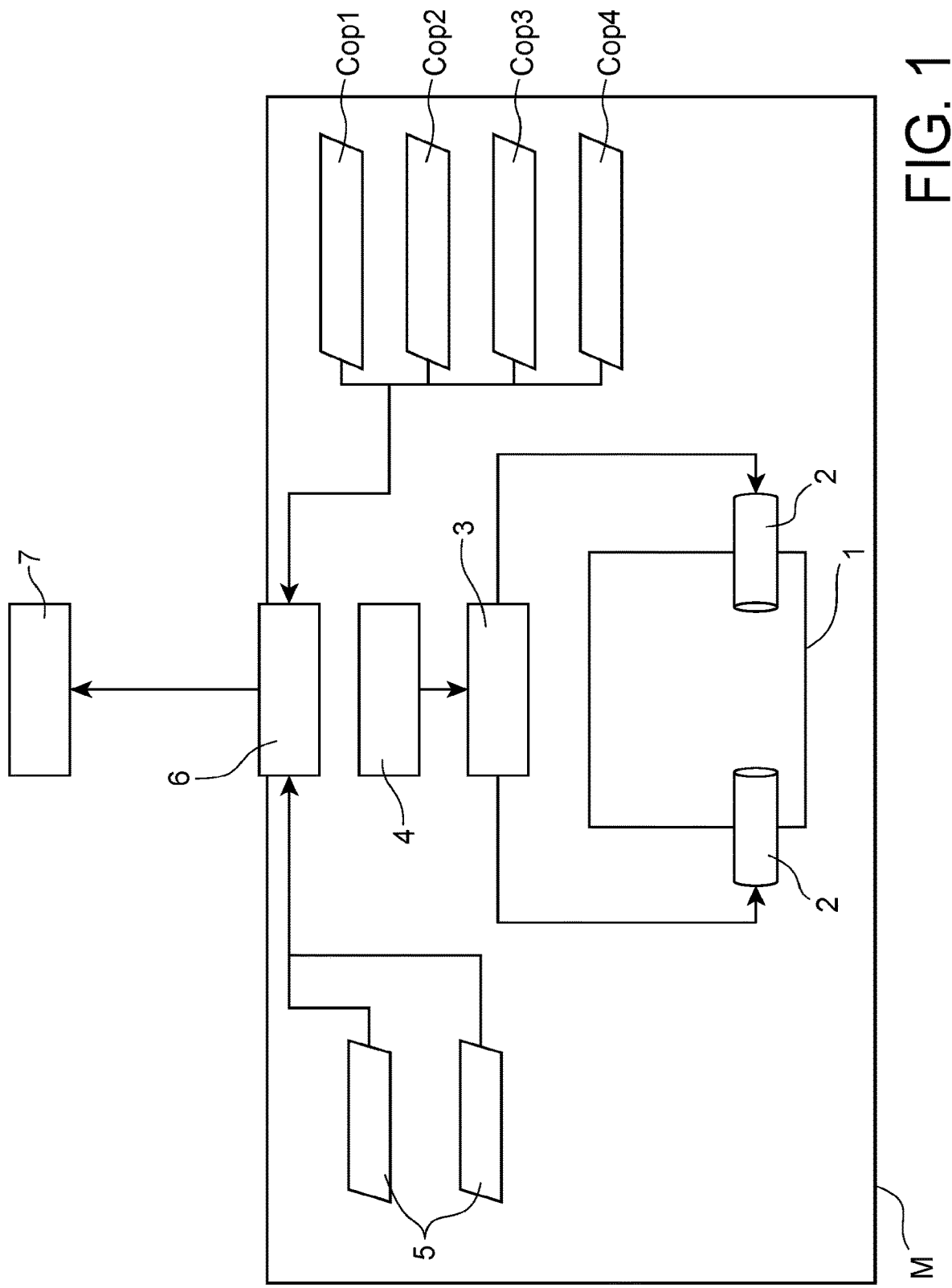
FIG. 1 is a diagram showing a system for monitoring a turboshaft engine according to one possible embodiment of the invention.

The invention relates to a system and a method for monitoring an aircraft turboshaft engine. As diagrammatically shown in FIG. 1, the turboshaft engine M includes a combustion chamber 1 in which one or more spark plugs 2 are installed in order to ignite an air/fuel mixture injected into the combustion chamber. The one or more spark plugs 2 are excited by an excitation circuit 3 which is configured to output breakdown pulses to the one or more spark plugs 2 upon receipt of an ignition command provided by an ignition control circuit 4.

The turboshaft engine M is further equipped with one or more vibration sensors 5, generally two accelerometers to ensure redundancy. These accelerometers are positioned and used primarily to determine a level of vibration of the turboshaft engine.

The first accelerometer is generally positioned at the front of the turboshaft engine and the second is generally positioned at the rear of the turboshaft engine, often on a casing so that it can be accessed during maintenance. The low-pressure (LP) shaft to which the fan of the turboshaft engine is attached passes through the entire turboshaft engine and a low-pressure unbalance appears on the various bearings that guide this shaft, at least one at the front and at least one at the rear. The exact position of the accelerometers varies from engine to engine.

The signals output by these accelerometers are sent to a data processing unit 6 on-board the aircraft (depending on the applications, this unit may or may not be integrated into the control circuit 4), which is responsible for determining the level of vibration. This level of vibration is transmitted to the cockpit for display on the instrument panel. The pilot thus has access to information needed to balance the engine.

The accelerometers 5 can also be used to monitor the wear of engine components such as bearings. For this purpose, the measurements output by the accelerometers are processed, for example by the data processing unit 6. As shown in FIG. 1, the data processing unit 6 can determine condition indicators (typically the results of statistical tests carried out on the accelerometer signals), whereas a computer 7, typically a ground computer, uses these indicators to determine information representative of the damage to the engine components and, if necessary, carries out failure diagnostics.

The invention proposes not using a dedicated sensor for detecting spark plug breakdown but instead relying on the one or more sensors 5 already used to measure the vibration level to detect this breakdown. Thus, the invention proposes a method comprising, on the basis of the vibration signal output by a vibration sensor 5, both determining a level of vibration of the turboshaft engine and determining a wear indicator for a spark plug 2.

In one possible embodiment, which will be used as an example hereafter, this method is implemented jointly by an on-board unit within the aircraft, for example the data processing unit 6, responsible for detecting and characterising the breakdowns of the spark plug, and by a ground computer, for example the computer 7, responsible for deducing the spark plug wear indicator from the characterisation of the breakdowns.

Figure 2:
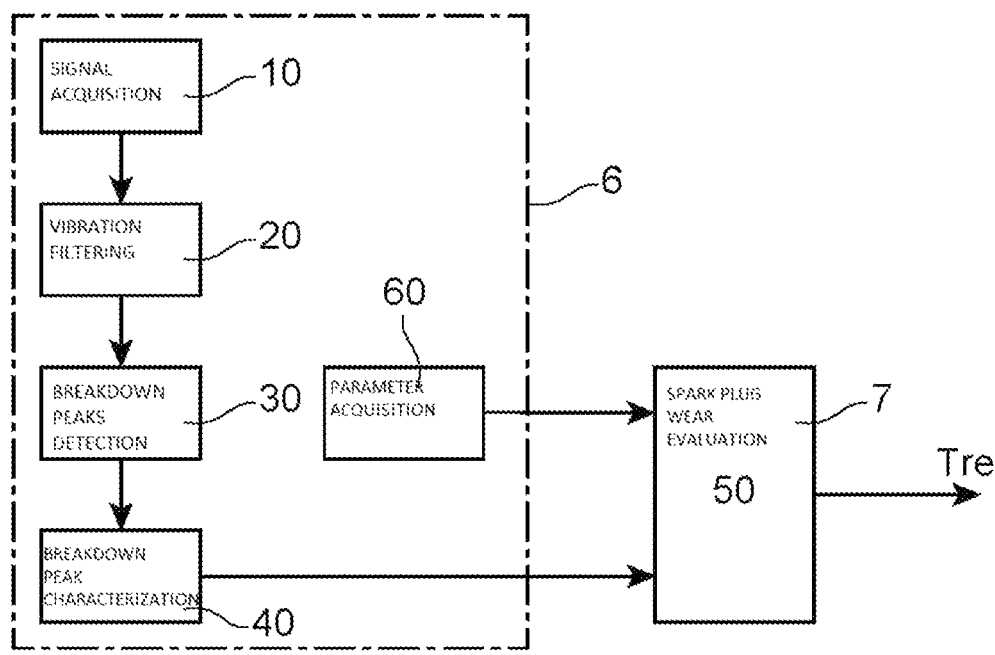
FIG. 2 is a diagram showing the sequence of the steps of a method for monitoring a turboshaft engine according to one possible embodiment of the invention.

With reference to FIG. 2, the data processing unit 6 carries out the following steps: a step 10 of acquiring the vibration signal output by an accelerometer 5, a step 20 of filtering the vibration signal output by the accelerometer 5, a step 30 of detecting breakdown peaks in the filtered vibration signal, and a step 40 of characterising the detected breakdown peaks. This characterisation is sent to the ground computer 7 which, during a step 50, deduces the spark plug wear indicator therefrom, for example in the form of a remaining time before replacement is recommended Tre.

Figure 3A:
FIGS. 3a, 3b and 3c respectively show an accelerometer signal, the accelerometer signal filtered so as to extract a signal representative of the breakdown of a spark plug, and the detection of the breakdown peaks in the filtered accelerometer signal.
Figure 3B:

The vibration measurement is disrupted by spark plug breakdown and the step 20 of filtering the vibration signal output by the accelerometer is designed to extract a signal representative of the breakdown of the spark plug from the vibration signal. For illustration purposes, FIG. 3a shows a vibration signal and FIG. 3b shows the result of the filtering of the vibration signal. FIGS. 3a and 3b show two separate phases: a first phase in burst mode, the purpose whereof is to ignite the gas mixture and a second phase (normal mode) at a lower breakdown frequency, the purpose whereof is to maintain the flame until it is self-sustaining.

The filtering of the vibration signal can only be carried out during periods of time in which the spark plugs 2 are instructed to breakdown, i.e. during the periods of time that correspond to the transmission of the ignition command to the excitation circuit 3 of the spark plugs 2.

In one possible embodiment, which is in particular implemented when the vibration sensor 5 is remote from the combustion chamber and thus captures little energy from the spark plug breakdown, a low-pass filtering of the vibration signal is implemented to retain only the low-frequency information. By way of example, a low-pass filter with a cut-off frequency of 5 Hz can be used. In one alternative embodiment, resampling of the vibration signal, for example by means of an anti-aliasing filter, is carried out prior to low-pass filtering. This prevents low-pass filtering from introducing distortions into the vibration signal sampled at high frequency (typically several tens of kHz).

In another possible embodiment, which is in particular implemented when the vibration sensor 5 captures more energy from the spark plug breakdown and when low-pass filtering thus risks destroying useful information, wavelet filtering is carried out, either with a standard wavelet (for example a Daubechies wavelet) or with a wavelet specifically adapted to the form of the breakdown detected by the accelerometer.

Figure 3C:
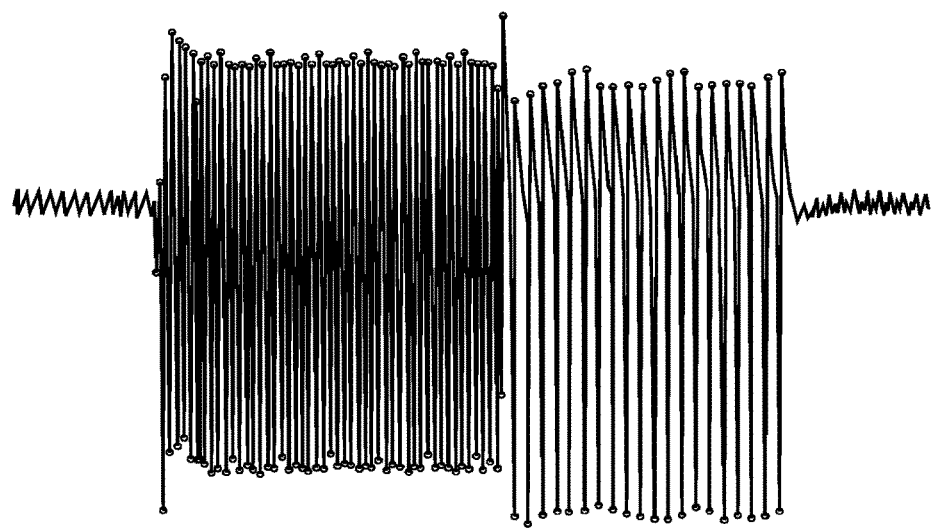

Once the vibration signal has been filtered, the data processing unit 6 detects breakdown peaks in the filtered vibration signal. This detection is carried out using conventional methods, such as by detecting local extrema by changing the sign of the derivative of the vibration signal or by threshold overshoot. This detection can be restricted to the periods of time in which the spark plugs 2 are instructed to breakdown, i.e. during the periods of time that correspond to the transmission of the ignition command to the excitation circuit 3 of spark plugs 2. For illustration purposes, FIG. 3c shows the detection of the peaks in the filtered vibration signal. In one embodiment, spurious peaks with an amplitude below a threshold can be excluded, this threshold being computed, for example, from the median of all positive peaks.

Once the peaks have been detected, the data processing unit 6 characterises these peaks (i.e. determines one or more characteristics of the peaks). This characterisation typically comprises a peak count.

This count can be accompanied by:
determining an amplitude of each of the peaks and hence a mean amplitude and the standard deviation thereof per breakdown phase (burst mode and normal mode); and/or
determining a peak frequency from a mean time between each breakdown during a time window corresponding to the transmission of the ignition command, and more particularly for each breakdown phase (burst mode and normal mode), accompanied by the standard deviation thereof for each breakdown phase.

This characterisation can also comprise computing a peak aperiodicity indicator. A breakdown aperiodicity is representative of a fault in the excitation circuit and the computation of this indicator makes it possible to differentiate between a spark plug wear problem (which is in particular characterised by a gradual drop in the amplitude of the peaks) and a problem in the excitation circuit. One example of an a periodicity indicator is that of the maximum time between two peaks or that of a count for the number of times the time between two peaks exceeds (possibly with a tolerance, for example of 25%) an expected value.

In one possible embodiment that prevents the filtering from introducing biases (for example a reduction in the amplitude of the peaks), this characterisation is carried out for the vibration signal itself, the detection of a peak in the filtered vibration signal making it possible to date this peak and to identify a corresponding peak in the unfiltered vibration signal.

At the end of a flight, for example, the characterisation of the breakdown peaks is downloaded from the on-board unit 6 to the ground computer 7. The latter is responsible for computing the spark plug wear indicator by using this characterisation of the breakdowns that occurred in-flight and, if necessary, the characterisations of the breakdowns that occurred during previous flights. Spark plug wear is directly linked to the number of breakdowns and the counting thereof can be used to estimate a remaining service life before replacement is recommended. By way of example, an aperiodicity is symptomatic of an impending failure and requires replacement as soon as possible, whereas a drop in amplitude is symptomatic of wear and requires a replacement to be scheduled.

In particular, the computer 7 can be configured to combine, by means of a spark plug damage model (i.e. by wear physics modelling), the characterisation of the breakdown peaks with operating conditions for the ignition of the turboshaft engine in order to synthesise a consolidated wear indicator. The damage model can in particular determine a weighting parameter based on the ignition operating conditions and weight the spark plug wear indicator using the weighting parameter to synthesise the consolidated wear indicator. The weighting parameter characterises the fact that the spark plug was used, not only under nominal operating conditions, but also under harsh operating conditions (for example high pressures or high temperatures), which have aggravated the damage caused thereto.

The operating conditions can be determined from measurements of at least one operating parameter from among a temperature, a pressure, a hygrometry, an air jet flow velocity and a fuel injection rate. These measurements are acquired during a step denoted by the reference numeral 60 in FIG. 2, potentially pre-processed by the on-board unit 6 and downloaded to the ground computer 7 to be combined with the wear indicator.

By way of example, in order to determine the consolidated wear indicator, the damage model can make use of:

the characterisation of the breakdown peaks,
a temperature measurement taken near the combustion chamber (for example a temperature at the combustion chamber inlet and a temperature at the high-pressure turbine outlet),
a measurement of the pressure taken near the combustion chamber (for example a pressure at the combustion chamber inlet and a pressure at the combustion chamber outlet),
hygrometry information (extracted for example from METAR-type meteorological observation reports),
a computation of the flow velocity of the air jet in the combustion chamber (this velocity can be estimated using a thermodynamic model from the engine speeds, the position of the variable geometries, the pressures and temperatures measured at the fan, the high-pressure compressor and, where relevant, the low-pressure compressor),
information on the fuel injection rate,
the current injected by the excitation circuit when measurable,
the time spent at different temperatures and different flow rates when the spark plugs are not breaking down.

The above paragraphs describe the example of the method implemented using an on-board data processing unit in the aircraft to detect and characterise the ignition peaks and using a ground computer to determine the spark plug wear indicator. The invention is not limited to this architecture, and also includes the entire implementation of this method using the on-board unit, the entire implementation thereof using the ground computer or according to a different manner of distributing the implementation of the steps of the method between the on-board unit and the ground computer.

The invention further relates to a computer program product comprising code instructions for implementing all or part of the steps of the method, when said program is executed on a computer, in particular the steps of filtering the vibration signal, and of detecting and of characterising the breakdown peaks.

The invention claimed is:

1. A method for monitoring an aircraft turboshaft engine which comprises a spark plug and a vibration sensor capable of outputting a vibration signal, comprising, based on the vibration signal output by the vibration sensor, both determining a level of vibration of the turboshaft engine as well as determining a wear indicator of the spark plug,
wherein determining the wear indicator comprises the steps of:
filtering the vibration signal output by the vibration sensor,
detecting breakdown peaks in the filtered vibration signal, and
characterizing the detected breakdown peaks,
the method further comprising:
transmitting an ignition command to an excitation circuit which is configured to output breakdown pulses to the spark plug upon receipt of the ignition command and wherein detecting breakdown peaks is only implemented when the ignition command is being transmitted.

2. The method according to claim 1, wherein the characterizing of the detected breakdown peaks comprises counting the peaks.

3. The method according to claim 1, wherein the characterizing of the detected breakdown peaks comprises determining an amplitude of each detected breakdown peak.

4. The method according to claim 1, wherein the characterizing of the detected breakdown peaks comprises determining a frequency of the detected breakdown peaks.

5. The method according to claim 4, wherein the characterizing of the detected breakdown peaks comprises computing a aperiodicity indicator of the detected breakdown peaks.

6. A data processing unit configured to implement the filtering, and detecting and characterizing the steps of the method according to claim 1.

7. A non-transitory computer program product comprising code instructions for implementing the filtering, and detecting and characterizing the steps of the method according to claim 1, when said program is executed on a computer.

8. A system for monitoring a turboshaft engine, comprising a ground computer configured to determine the spark plug wear indicator from the characterizing of the ignition peaks carried out by the data processing unit according to claim 6 on board the aircraft.

9. A method for monitoring an aircraft turboshaft engine which comprises a spark plug and a vibration sensor capable of outputting a vibration signal, comprising, based on the vibration signal output by the vibration sensor, both determining a level of vibration of the turboshaft engine as well as determining a wear indicator of the spark plug,
wherein determining the wear indicator comprises the steps of:
filtering the vibration signal output by the vibration sensor,
detecting breakdown peaks in the filtered vibration signal, and
characterizing the detected breakdown peaks,
the method further comprising:
transmitting an ignition command to an excitation circuit configured to output breakdown pulses to the spark plug upon receipt of the ignition command and wherein filtering the vibration signal is only implemented when the ignition command is being transmitted.

10. The method according to claim 9, wherein the characterizing of the detected breakdown peaks comprises counting the peaks.

11. The method according to claim 9, wherein the characterizing of the detected breakdown peaks comprises determining an amplitude of each detected breakdown peak.

12. The method according to claim 9, wherein the characterizing of the detected breakdown peaks comprises determining a frequency of the detected breakdown peaks.

13. The method according to claim 12, wherein the characterizing of the detected breakdown peaks comprises computing a aperiodicity indicator of the detected breakdown peaks.

14. A data processing unit configured to implement the filtering, and detecting and characterizing the steps of the method according to claim 9.

15. A non-transitory computer program product comprising code instructions for implementing the filtering, and detecting and characterizing the steps of the method according to claim 9, when said program is executed on a computer.

16. A system for monitoring a turboshaft engine, comprising a ground computer configured to determine the spark plug wear indicator from the characterizing of the ignition peaks carried out by the data processing unit according to claim 15 on board the aircraft.

17. A method for monitoring an aircraft turboshaft engine which comprises a spark plug and a vibration sensor capable of outputting a vibration signal, comprising, based on the vibration signal output by the vibration sensor, both determining a level of vibration of the turboshaft engine as well as determining a wear indicator of the spark plug,
wherein determining the wear indicator comprises the steps of:
filtering the vibration signal output by the vibration sensor,
detecting breakdown peaks in the filtered vibration signal, and
characterizing the detected breakdown peaks,
the method further comprising:
based on the characterizing of the detected breakdown peaks, discriminating between a fault in the spark plug and a fault in an excitation circuit configured to output breakdown pulses to the spark plug upon receipt of an ignition command.

18. The method according to claim 17, wherein the characterizing of the detected breakdown peaks comprises counting the peaks.

19. The method according to claim 17, wherein the characterizing of the detected breakdown peaks comprises determining an amplitude of each detected breakdown peak.

20. The method according to claim 17, wherein the characterizing of the detected breakdown peaks comprises determining a frequency of the detected breakdown peaks.

21. The method according to claim 20, wherein the characterizing of the detected breakdown peaks comprises computing a aperiodicity indicator of the detected breakdown peaks.

22. A data processing unit configured to implement the filtering, and detecting and characterizing the steps of the method according to claim 17.

23. A non-transitory computer program product comprising code instructions for implementing the filtering, and detecting and characterizing the steps of the method according to claim 17, when said program is executed on a computer.

24. A system for monitoring a turboshaft engine, comprising a ground computer configured to determine the spark plug wear indicator from the characterizing of the ignition peaks carried out by the data processing unit according to claim 23 on board the aircraft.

* * * * *

UNITED STATES PATENT AND TRADEMARK OFFICE
CERTIFICATE OF CORRECTION

PATENT NO. : 11,639,707 B2
APPLICATION NO. : 17/059369
DATED : May 2, 2023
INVENTOR(S) : Demaison Page 1 of 1

It is certified that error appears in the above-identified patent and that said Letters Patent is hereby corrected as shown below:

In the Specification

In Column 5, Line 19, delete "a periodicity" and insert -- aperiodicity --, therefor.

Signed and Sealed this
Fifth Day of December, 2023

Katherine Kelly Vidal
*Director of the United States Patent and Trademark Office*